3,626,786
PISTON-CRANK MECHANISMS
Haruo Kinoshita, Hamamatsu-shi, and Isao Shirayanagi, Shizuoka-ken, Japan, assignors to Yamaha Hatsudoki Kabushiki Kaisha, Hamakita-shi, Japan
Filed Jan. 26, 1970, Ser. No. 5,875
Claims priority, application Japan, Jan. 30, 1969, 44/6,903; Aug. 1, 1969, 44/60,875; Oct. 7, 1969, 44/95,749; Oct. 18, 1969, 44/83,450
Int. Cl. G05g 1/00
U.S. Cl. 74—604
5 Claims

ABSTRACT OF THE DISCLOSURE

A piston-crank mechanism of the type comprising a piston disposed in a cylinder for reciprocal motion therein, a crank shaft rotatably mounted within a crank case and a connecting rod connecting said piston with said crank shaft. An internal gear is fixed in the crank case and a small gear having a number of teeth one half of that of the internal gear is rotatably mounted on the crank pin of the crank shaft. The connecting rod has one end pivotally connected to the piston and the other end pivotally connected to the small gear.

BACKGROUND OF THE INVENTION

Field of the invention

The present invention relates to a piston-crank mechanism for use in internal combustion engines, compressors and the like, and more particularly to such a piston-crank mechanism which is so designed that the vibrations due to reciprocating mass and rotating mass are completely or substantially balanced.

Description of the prior art

A conventional piston-crank mechanism comprises a piston disposed in a cylinder for reciprocatory movement therein and a rotatable crank shaft disposed in a crank case, which are connected with each other by a connecting rod, but such piston-crank mechanism is subject to a vibration due to the unbalance of the reciprocating mass and the rotating mass. In order to eliminate such unbalance vibration, various means have been proposed but none of them has been entirely satisfactory with respect to its intended purpose, i.e. to completely avoid the vibration with a simple construction.

SUMMARY OF THE INVENTION

The present invention has for its principal object the provision of a novel piston-crank mechanism which obviates the aforesaid drawback of the conventional piston-crank mechanism and which is simple in construction and yet capable of effectively preventing the vibration.

According to one aspect of the invention, there is provided a piston-crank mechanism having a piston disposed in a cylinder for reciprocative movement therein, a crank shaft rotatably mounted in a crank case and a connecting rod connecting said piston with said crank shaft, characterized in that an internal gear is fixed to the crank case, while a small gear meshing with said internal gear and having a number of teeth one half of that of said internal gear is rotatably mounted on the crank pin of said crank shaft, and said connecting rod is pivoted at one end to said piston and at the other end to said small gear.

According to the construction of the invention described above, the connecting rod is pivotally connected to the small gear on the pitch circle of the latter, so that the point of the pivotal connection will make a reciprocal linear motion incident to rotation of the crank shaft. In this case, an unbalance vibration of the piston-crank mechanism can be completely prevented by providing a suitable size of a first balancing mass on the diametrically opposite side of the crank shaft with respect to the crank pin and a suitable size of a second balancing mass on the diametrically opposite side of the small gear with respect to the point of the pivotal connection.

If the point of the pivotal connection between the connecting rod and the small gear is selected in a piston parted away from the pitch circle of the small gear, said point of the pivotal connection will make an elliptic motion incident to rotation of the crank shaft. In this case, complete balance of the primary inertia force can be attained by suitably selecting the sizes of the balancing masses but the secondary and higher inertia forces cannot be balanced. In the mechanism of this invention, however, the inertia forces of such higher degrees can also be made much smaller than in the conventional mechanism.

The present invention also has for another object the provision of a novel balancing method in the piston-crank mechanisms of the type described.

Namely, in the piston-crank mechanisms of the type described wherein the small gear bodily rotates while rotating round its own axis, a heretofore known balancing method cannot be employed as such because both the bodily rotating portion and the portion rotating round its own axis ought to be maintained in balance respectively. The instant invention provides a novel balancing method adapted to such piston-crank mechanism.

The present invention can be practised in various modes but a few embodiments thereof will be described hereinafter with reference to the accompanying drawings.

DESCRIPTION OF THE PREFERRED EMBODIMENTS

Figure 1:
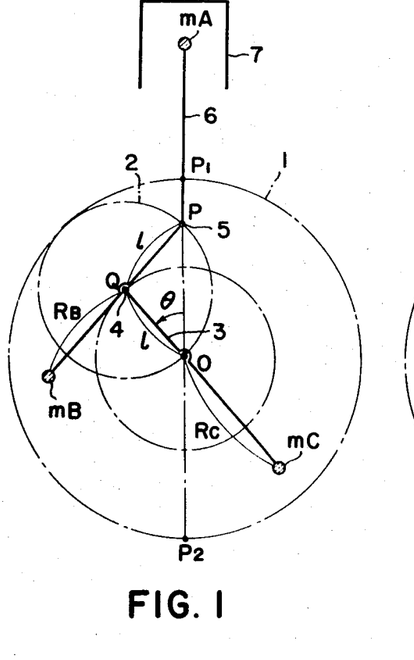
FIGS. 1 and 2 are diagrams for illustrating the principle of the present invention.

With reference first to FIG. 1, numeral 1 designates an internal gear and numeral 2 designates a small gear meshing with said internal gear and having a number of teeth one-half of that of the latter. The small gear 2 is rotatably supported by a crank pin 4 of a crank shaft 3 and is provided with an integral pivot shaft 5 on the pitch circle thereof. A connecting rod 6 is pivotally connected to the pivot shaft 5 at one end and to a piston pin of a piston 7 at the other end. Thus, the explosive force of the piston 7 is transmitted to the crank shaft 3. The reciprocating mass of the piston and the connecting rod is represented by a mass $mA$ at the piston pin. In order to offset the inertia force of mass $m\text{A}$, a bodily rotation balancing mass $m\text{C}$ is added to the crank shaft 3, which is a bodily rotating portion, at a location diametrically opposite to the crank pin 4 and a rotation balancing mass $m\text{B}$ is added to the small gear 2, which is a portion rotating round its own axis, at a location diametrically opposite to the pivot shaft 5. These balancing masses are added after the rotational balance of the crank shaft 3 and the small gear 2 has been attained.

Now, with O representing the center of the crank shaft 3, P representing the center of the pivot shaft 5 and Q representing the center of the crank pin 4, when the mechanism is in operation, point P reciprocates along a line $P_1$–O–$P_2$ which is the diametrical line of the pitch circle of the internal gear 1 extending in the direction of piston movement. When the vertical and horizontal inertia forces of mass $m\text{A}$, $m\text{B}$ and $m\text{C}$ are represented by $F_{\text{A}x}$, $F_{\text{A}y}$; $F_{\text{B}x}$, $F_{\text{B}y}$; and $F_{\text{C}x}$, $F_{\text{C}y}$ respectively, the following equations are established, with the rotational angle $\theta$ of the crank shaft as a parameter:

$$F_{\text{A}x} = 2lmA\left[\cos\theta\cdot\left(\frac{d\theta}{dt}\right)^2 + \frac{d^2\theta}{dt^2}\sin\theta\right]$$

$$F_{\text{A}y} = 0$$

$$F_{\text{B}x} = (l-RB)mB\left[\cos\theta\cdot\left(\frac{d\theta}{dt}\right)^2 + \frac{d^2\theta}{dt^2}\sin\theta\right]$$

$$F_{\text{B}y} = (l-RB)mB\left[\sin\theta\cdot\left(\frac{d\theta}{dt}\right)^2 - \frac{d^2\theta}{dt^2}\cos\theta\right]$$

$$F_{\text{C}x} = -RCmC\left[\cos\theta\cdot\left(\frac{d\theta}{dt}\right)^2 + \frac{d^2\theta}{dt^2}\sin\theta\right]$$

$$F_{\text{C}y} = -RCmC\left[\sin\theta\cdot\left(\frac{d\theta}{dt}\right)^2 - \frac{d^2\theta}{dt^2}\cos\theta\right]$$

wherein $l$: the radius of the crank shaft 3 or the radius of the pitch circle of the small gear 2
$RB$: the length of the arm of mass $m\text{B}$
$RC$: the length of the arm of mass $m\text{C}$ Here, if the conditions of $$lmA = RBmB$$
$$(mA+mB)l = mCRC$$

are imparted, it is stated that $$F_{\text{A}x} + F_{\text{B}x} + F_{\text{C}x} = 0$$
$$F_{\text{A}y} + F_{\text{B}y} + F_{\text{C}y} = 0$$

Namely, with the arrangement of FIG. 1, not only the primary inertia force but also inertia forces of higher degrees are completely balanced under the conditions set forth above.

Figure 2:
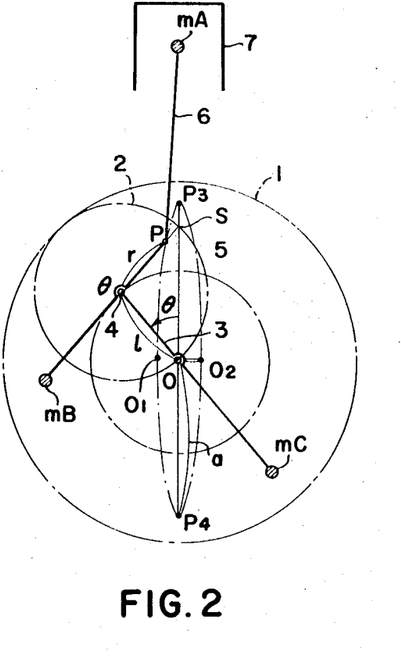

The arrangement of FIG. 2 differs from that of FIG. 1 in that the pivot shaft 5 is located, not on the pitch circle of the small gear 2 but within said pitch circle. The numbers of teeth of the internal gear 1 and the small gear 2 are in the ratio of 2:1, similar to the case of FIG. 1.

In this case, the center P of the pivot shaft moves on an ellipse of $P_3$–$O_1$–$P_4$–$O_2$ having a major diameter extending in the direction of piston movement and whose major and minor diameters are respectively represented as follows:

Major diameter $a = l + r$
Minor diameter $b = l - r$ wherein $r$ stands for the distance between the pivot shaft 5 and the crank pin 4.

This arrangement is capable of completely balancing the primary inertia force but not capable of balancing the secondary and higher inertia forces. Nevertheless, the values of the inertia forces of higher degrees can be made much smaller than those conventionally known.

Namely, as compared with the secondary inertia force created in the conventional piston-crank mechanism (which is usually as small as about one-fourth of the primary inertia force and, therefore, normally ignored), the residual secondary inertia force in the arrangement of FIG. 2 is very small and about $b^2/a^2$. For instance, if $2r = l$, the residual secondary inertia force will be $$\frac{b^2}{a^2} = \frac{1}{9}$$

as contrasted to the secondary inertia force of the conventional piston-crank mechanism. Further, when the secondary inertia force of the instant mechanism is compared with the primary inertia force remaining in the conventional mechanism, which is larger than the secondary inertia force (about 4 times), the former is about $\frac{1}{40}$ of the latter. In this view, it can be said from the practical point of view that the instant mechanism is free of vibration.

Figure 3:
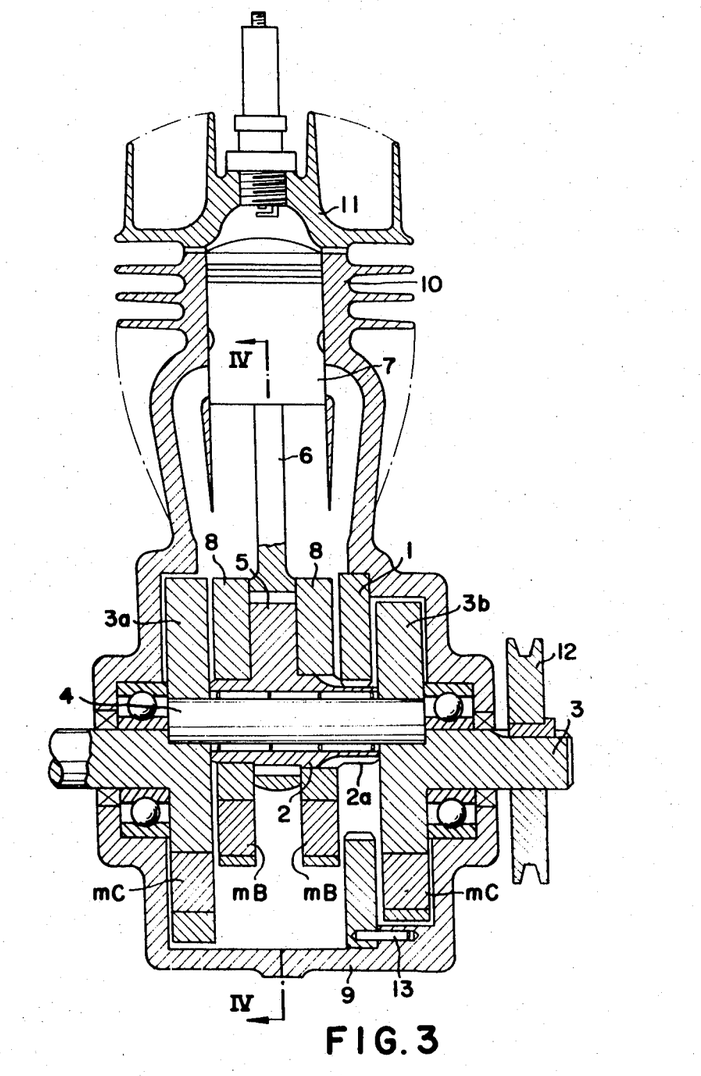
FIG. 3 is a vertical cross-sectional view of a first embodiment in which the principle of FIG. 1 is embodied in a two-cycle internal combustion engine.
Figures 4, 6:
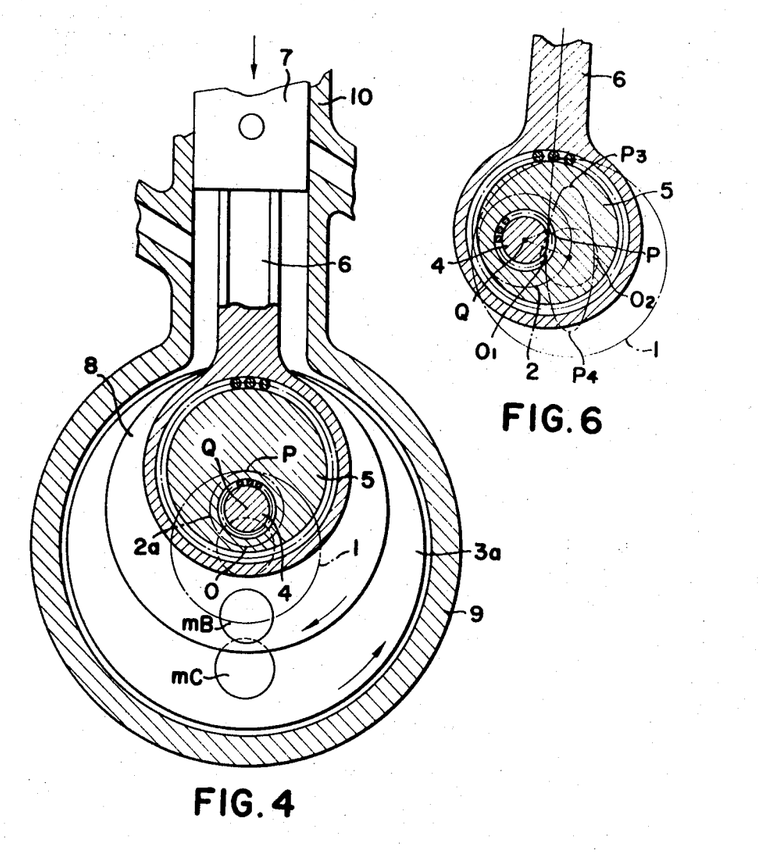
FIG. 4 is a cross-sectional view taken on the line IV—IV of FIG. 3.
FIG. 6 is a cross-sectional view showing a portion of a construction embodying the principle of FIG. 2.
Figure 5:
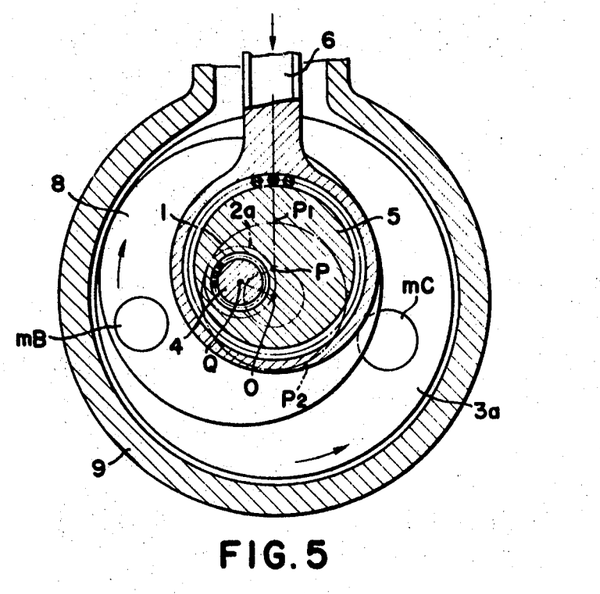
FIG. 5 is a cross-sectional view similar to FIG. 4 but showing the state wherein the piston is lowered below the top dead center.

FIGS. 3, 4 and 5 show a two-cycle engine embodying the principle shown in FIG. 1, and the corresponding parts are indicated by same reference numerals. Namely, numeral 3 designates a crank shaft having a crank pin 4 and crank webs 3a, 3b. The crank webs 3a, 3b are each provided with a bodily rotation balancing mass $m\text{C}$ of such material as lead. Instead of adding the mass $m\text{C}$ (or in addition thereto) a weight reducing hole may be formed in each crank web 3a or 3b at a location diametrically opposite to the mass $m\text{C}$. A small gear 2 is mounted on the crank pin 4 through a needle bearing. At the central portion the small gear 2 has a pivot shaft 5 provided integrally therewith. The pivot shaft 5 is eccentric to the axis of the small gear 2 by a distance equal to the crank radius of the crank shaft 3. Numeral 8 designates webs each fixed to each side of the pivot shaft 5. The webs 8 are each provided with a rotation balancing mass $m\text{B}$ of such material as lead. This embodiment is a crank chamber compression-type two cycle engine and the webs 8 are made of an aluminum alloy so as to minimize the volume of the crank chamber. An internal gear 1 is positioned between the crank web 3b and the web 8, and secured to a crank case 9 by means of a pin 13, with the teeth thereof in meshing engagement with the teeth 2a of the small gear 2. The number of teeth of the internal gear 1 is twice that of the small gear 2. A connecting rod 6 has one end pivotally connected to the pivot shaft 5 through a needle bearing and the other end connected to a piston 7. Numeral 10 designates a cylinder; 11 a cylinder head and 12 an output pulley. The above-described construction is essentially the same as that of a conventional crank chamber compression-type two cycle engine.

Turning now to FIG. 6, there is shown an embodiment in which the principle of FIG. 2 is materialized. The construction is the same as that of the engine shown in FIGS. 3–5, with the only exception that the position of the pivot shaft through which one end of the connecting rod is connected to the small gear is different. The construction will not be described in detail herein, since the corresponding parts are indicated by the same reference numerals.

The embodiment of FIGS. 2 and 6 is not only practical but also of positive advantage over the one shown in FIGS. 3–5. Specifically, the embodiments of FIGS. 2 and 6, as will be self-evident, have the following advantages, on the basis of same piston stroke:

(1) Since the arm of the pivot shaft 5 is short in length, the diameter of said shaft is small and hence the large end of the connecting rod 6 and the crank webs 3a, 3b can be small. Therefore, the entire crank case can be reduced in size.

(2) In spite of the entire crank case being reduced in size as described above, the diameters of the internal gear 1 and the small gear 2 are large, so that the strengths of said respective gears are increased and the durabilities of the same are improved.

Although the operation of the mechanism according to the invention will be readily apparent, the operation of the crank chamber compression-type two cycle engine of the construction shown in FIGS. 3-5 will be explained hereunder as a representative embodiment.

The explosive force exerted on the piston 7 causes a downward movement of the pivot shaft 5 through the connecting rod 6. The small gear 2 integral with the pivot shaft 5 is in meshing engagement with the internal gear 1, so that it bodily rotates in a counterclockwise direction while rotating in a clockwise direction about its own axis, causing the crank shaft to rotate in a counterclockwise direction through the crank pin 4. In this case, the center P of the pivot shaft 5 make a linear reciprocatory movement along the diameter of the pitch circle of the internal gear 1 extending in the direction of piston movement.

In the construction of FIG. 6, the operation is essentially the same as described above, except that the center P of the pivot shaft 5 moves along the ellipse having a major diameter extending in the direction of piston movement as shown by the chain line. Incidentally, in the arrangement of FIGS. 2 and 6, the track of motion of the pivot shaft 5 is not necessarily an ellipse approximating to a straight line but may be close to a circle, and even in case of the latter the vibration can be reduced substantially as compared with the conventional piston-crank mechanism.

Figure 7:
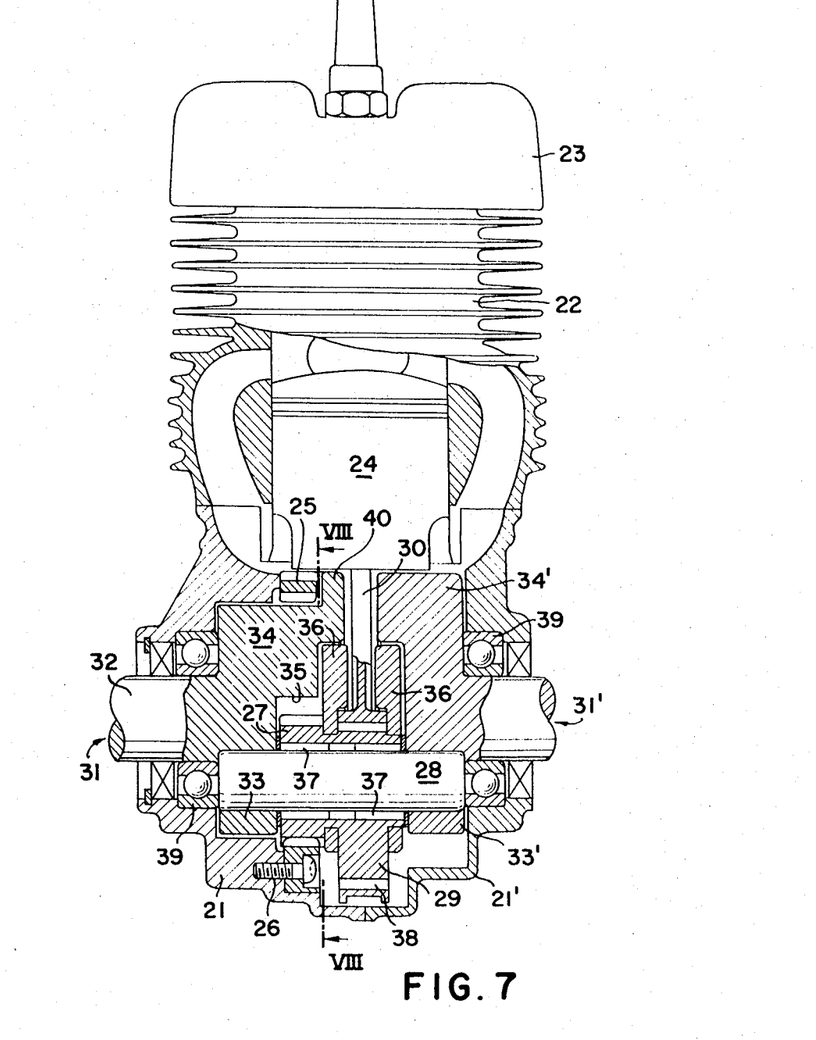
FIG. 7 is a vertical cross-sectional view of a second embodiment of the invention.
Figure 8:
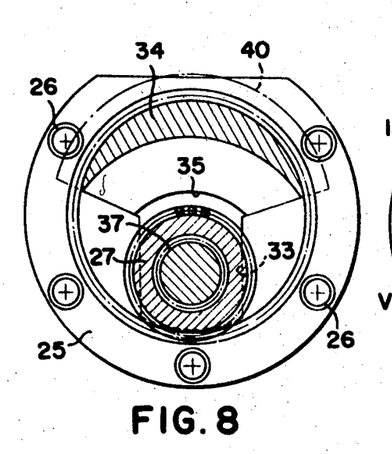
FIG. 8 is a cross-sectional view taken on the line VIII—VIII of FIG. 7.

FIGS. 7 and 8 show still another embodiment of the present invention, and the engine thereshown is so designed as to facilitate the ease of assembly and disassembly. Referring to FIGS. 7 and 8, numerals 21, 21' designate a crank case split vertically into two sections; 22 a cylinder and 23 a cylinder head. Within the cylinder 22 is disposed a piston 24 for reciprocatory movement therein. Numeral 25 designates an internal gear secured to the crank case 21 by means of a screw 26 and meshing with a small gear 27. The small gear 27 has a number of teeth one-half of that of the internal gear 25 and is rotatably mounted on a crank pin 28. A pivot shaft 29 is formed on the small gear 27 integrally therewith in an eccentric relation thereto, to which the large end of a connecting rod 30 is connected through a bearing 38, the small end of said connecting rod being connected to the piston 24. Numeral 31 designates a crank shaft which is supported at its journal 32 by the left side section 21 of the crank case through a bearing 39 and has a crank web 33 located inside of the crank chamber. Numeral 31' designates a crank shaft which similarly is supported at its journal 32' by the right side section 21' of the crank case through a bearing 39' and has a crank web 33' located within the crank chamber. The crank web 33 extends into the hollow of the internal gear 25 to form a cavity 35 for receiving the small gear 27 therein, said extended portion of the crank web 33 constituting a bodily rotation balancing mass 34. The crank web 33' is formed with a bodily rotation balancing mass 34' at a location opposite to the crank pin 28. Numeral 36 designates a rotation balancing mass mounted on the small gear 27 in such a manner that it is eccentric to said smaller gear in a direction opposite to the direction of eccentricity of the pivot shaft 29. It is to be noted that the bodily rotation balancing mass 34 is provided with an auxiliary mass 40 positioned between the internal gear 25 and the connecting rod 30, whereby the balance can optionally be adjusted and further the compression efficiency in the crank chamber can be enhanced in case of a crank chamber pre-compression-type engine. The diameter of the crank web 33 is smaller than the inner diameter of the internal gear 25 except the part of the auxiliary mass 40.

For disassembling the engine constructed as described above, the cylinder 22 is disconnected from the crank case 21, 21' and then the right side section 21' of the crank case is removed. Thereafter, the crank pin 28 having the small gear 27, the pivot shaft 29 and the rotation balancing mass 36 mounted thereon and the crank shafts 31, 31' respectively consisting of the crank webs 33, 33' fixed to one ends thereof, the bodily rotation balancing masses 34, 34' and the journals 32, 32' are withdrawn to the right, whereupon the small gear 27 is released from engagement with the internal gear 25 and the left side bodily balancing mass 34 is pulled out from the hollow of the internal gear 25 and thus removed from the left side crank case 21 while keeping the internal gear 25 fixed in the left side crank case 21. The assembly of the engine can be readily attained by a procedure reverse to that described above.

Next, the piston-crank mechanism balancing method of this invention will be described with reference to the embodiment of FIGS. 1 and 3-5.

Figures 9, 10, 11:
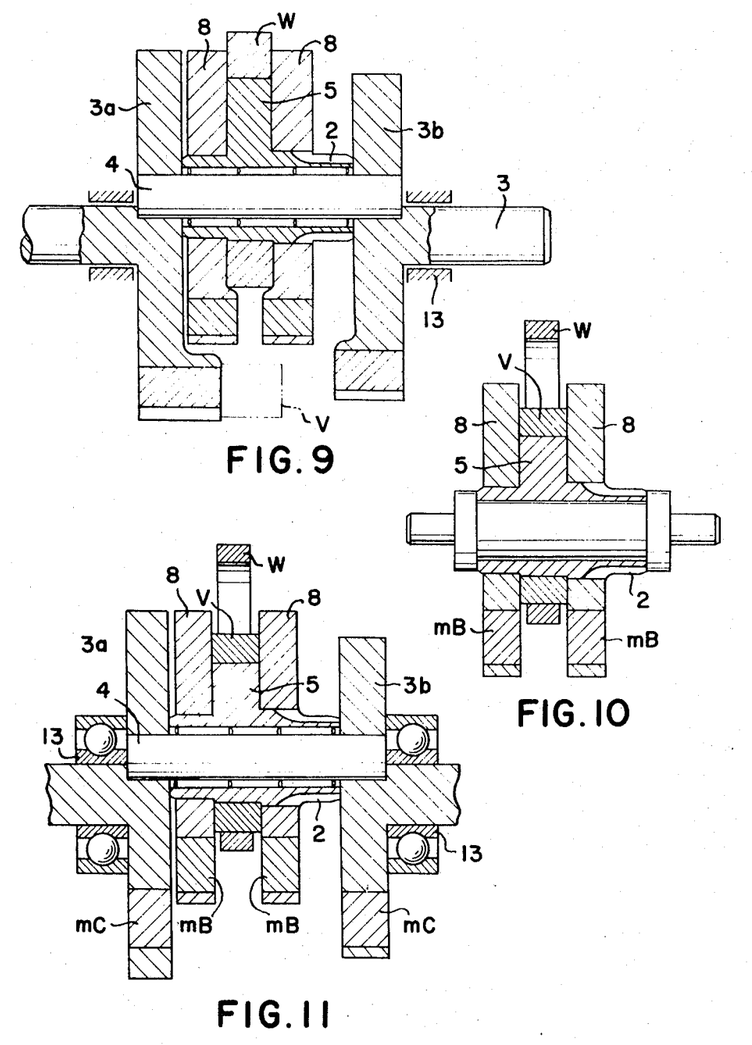
FIG. 9 is a cross-sectional view for the purpose of explaining a balancing method according to the present invention.
FIGS. 10 and 11 are cross-sectional views illustrating another balancing method of the invention.

First of all, the part connected to the pivot shaft 5, i.e. the connecting rod 6, the bearings at the opposite ends of said connecting rod, the piston 7, the piston pin and the crips thereof (not shown), and the piston rings, are disconnected from the pivot shaft 5, and a balance ring W of a mass equal to the total mass $mA$ of said parts is mounted on the pivot shaft 5 in concentrical relation thereto (FIG. 9). Then, the parts rotatably supported by the crank pin 4 (the small gear 2, the pivot shaft 5 and the webs 8) are placed in a balanced state with respect to the axis of said crank pin 4. This is attained by boring a hole into a portion of each web 8 or filling a metal of large specific gravity, such as lead, into said hole and using a balance tester. The balanced condition of the rotating mass is satisfied by this operation.

Then, the assembly thus balanced is mounted on the crank shaft 3 and the balance around the crank bearings 13 is attained in a manner similar to that described above, whereby the balanced condition of the bodily rotating mass is also satisfied.

After the crank balance of the piston-crank mechanism has been atttained in the manner described above, the balance ring W is removed from the pivot shaft 5 and one end of the connecting rod 6 is connected to said pivot shaft. Thus, a piston-crank mechanism in complete balance of inertia forces can be obtained.

The balance of the other embodiments can also be obtained by the above-described method.

Figure 12:
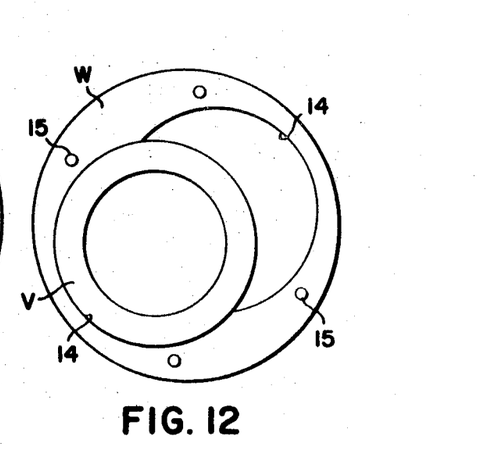
FIG. 12 is a plan view of a tool used in the method of FIGS. 10 and 11.

FIGS. 10-12 show another balancing method which is applicable to the construction of FIGS. 2 and 6. Namely, when the reciprocating mass (the mass of the piston, the piston pin and crips thereof, the piston rings and the reciprocating mass of the connecting rod, plus the mass of the small end bearing) of all the mass connected to the pivot shaft 5 is represented by a mass $mA$ at the piston pin; a rotation balancing mass $mB$ is attached to the small gear, a part rotating around its own axis, at a location opposite to the pivot shaft 5; a bodily rotation balancing mass $mC$ is attached to the crank shaft, a bodily rotating part, at a location opposite to the crank pin 4; and further the rotating mass (the rotating mass of the connecting rod plus the mass of the large end bearing) is represented by a mass $mD$ at the pivot shaft, the vertical and horizontal primary inertia forces $F_{Ax}$, $F_{Ay}$, $F_{Bx}$, $F_{By}$, $F_{Cx}$, $F_{Cy}$, $F_{Dx}$ and $F_{Dy}$ of these masses $mA$, $mB$, $mC$ and $mD$, which are largest in absolute value, are represented by the following formulae, using the rotational angle $\theta$ of the crank shaft as a parameter:

$$F_{Ax} = mA(l+r)\left\{\left(\frac{d\theta}{dt}\right)^2 \cos\theta + \frac{d^2\theta}{dt^2}\sin\theta\right\}$$

$$F_{Ay} = 0$$

$$F_{Bx} = mB(l-RB)\left\{\left(\frac{d\theta}{dt}\right)^2 \cos\theta + \frac{d^2\theta}{dt^2}\sin\theta\right\}$$

$$F_{By} = mB(l+RB)\left\{\left(\frac{d\theta}{dt}\right)^2 \sin\theta - \frac{d^2\theta}{dt^2}\cos\theta\right\}$$

$$F_{Cx} = -mCRC\left\{\left(\frac{d\theta}{dt}\right)^2 \cos\theta + \frac{d^2\theta}{dt^2}\sin\theta\right\}$$

$$F_{Cy} = -mCRC\left\{\left(\frac{d\theta}{dt}\right)^2 \sin\theta - \frac{d^2\theta}{dt^2}\cos\theta\right\}$$

$$F_{Dx} = mD(l+r)\left\{\left(\frac{d\theta}{dt}\right)^2 \cos\theta + \frac{d^2\theta}{dt^2}\sin\theta\right\}$$

$$F_{Dy} = mD(l-r)\left\{\left(\frac{d\theta}{dt}\right)^2 \sin\theta - \frac{d^2\theta}{dt^2}\cos\theta\right\}$$

wherein:

RB: the length of arm of the rotation balancing mass $m$B
RC: the length of arm of the bodily rotating balancing mass $m$C.

Here, if the following conditions are imparted, namely $$mB.RB = \frac{l+r}{2}mA + mD.r \quad \text{(a)}$$

$$mC.RC = \frac{l+r}{2}mA + mD.l \quad \text{(b)}$$

it is stated that $$F_{Ax} + F_{Bx} + F_{Cx} + F_{Dx} = 0$$

$$F_{Ay} + F_{By} + F_{Cy} + F_{Dy} = 0$$

In other words, in this construction the primary inertia forces can be balanced completely by giving the conditions as determined by Equations a and b above. In this case, it is impossible to attain the balance of the secondary and higher inertia forces but the values of these inertia forces can be made extremely small as compared with those of the conventional piston-crank mechanism. From the practical point of view, therefore, it can be said that the instant piston-crank mechanism is free of vibration.

Equation a represents the balanced condition of the parts rotating around their own axes, i.e. the parts rotatably supported by the crank pin. From this equation which may be re-written as $$mB \cdot RB = \frac{l+r}{2}mA + mD \cdot r = l\left(\frac{l+r}{2l}mA\right) + mD \cdot r$$

it will be understood that in order to finally attain the balance around the crank pin 4, it is only necessary to adjust $RB \cdot mB$ by adding $$mA\frac{l+r}{2l}$$

to a position S which is at a distance $l$ in the direction of eccentricity of the pivot shaft 5, $m$D to a position P which is at a distance $r$ in the direction of eccentricity of said pivot shaft 5 and further an unbalancing mass $RB \cdot mB$ to a diametrically opposite position.

Equation b represents the balanced condition of bodily rotating parts, i.e. the parts rotatably supported by the crank shaft bearing. By re-writing the equation as $$mC \cdot RC = mB \cdot l + \frac{l+r}{2}mA + mD \cdot l$$

$$= l\left(mB + mA\frac{l+r}{2l} + mD\right)$$

it will be seen that the balance around the crank shaft bearings 13 can finally be attained by adjusting the mass $RC \cdot mC$ by adding $$\frac{l+r}{2l}mA, mB \text{ and } mD$$

to the crank pin 4 which is eccentric by a distance $l$ and an unbalancing mass $RC \cdot mC$ at a diametrically opposite position. By the way, in the present invention masses $$\frac{l+r}{2l}mA, mB \text{ and } mD$$

are added to the parts supported on the crank pin 4, for satisfying Equation a and yet the center of gravity of these parts coincides with the crank pin 4. Therefore, all that is necessary is to mount the assembly of these parts on the crank pin 4 as it is, without reducing the mass therefrom nor adding a specific mass thereto, and then add $RC \cdot mC$ to attain the balance of the bodily rotating portion.

Practically, the balance of the piston-crank mechanism can be attained in the following manner:

First of all, the parts connected to the pivot shaft 5, i.e. the connecting rod 6 and the bearing at the opposite ends thereof, the piston, the piston pin and the clip thereof, and piston ring are removed, and a balance ring V of a mass equivalent to the rotating mass $m$D is mounted on the pivot shaft 5 as shown in FIG. 10. Then, a balance ring W having a mass of $$\frac{l+r}{2l}mA$$

is fitted around the balance ring V. The balance ring W, as shown in FIG. 12, has formed therein two circular holes 14, 14 which are concentric with points located at a distance of $l-r$ from the center of the balance ring W in opposed relation to each other with respect to said center of the balance ring W respectively and each of which has a diameter equal to the outer diameter of the balance ring V, and is fitted on the balance ring V with the latter received in one of said circular opening. Then, the position of the balance ring W relative to the crank webs 8 is determined by means of pins 15 provided thereon in such a manner that the center of said balance ring W is positioned at a point located in the direction of eccentricity of the pivot shaft 5 on a line connecting the center Q of the crank pin 4 with the center P of said pivot shaft 5. Upon completion of this, the balance around the crank pin 4 of the parts rotatably connected to the crank pin 4, i.e. the small gear 2, the pivot shaft 5 and the crank webs 8, is realized. This is attained by using a balance tester and drilling holes in the crank webs 8 or filling the holes with a metal of large specific gravity, such as lead. The conditional Equation a given above can be satisfied in the manner described. Thereafter, the assembly thus obtained is mounted on the crank shaft 3 as shown in FIG. 11 and the balance around the crank shaft bearings 13 is attained in a similar manner, whereby the conditional Equation b given above is satisfied.

As will be understood from the foregoing, according to the balancing method of this invention the balance of rotating parts is attained by adding the mass $m$D at the position of $r$ and the mass $$mA\frac{l+r}{2l}$$

at the position of $l$, and the balance of bodily rotating parts can simultaneously be obtained in that state. After the balance has been obtained in the manner described, the masses $$mD \text{ and } mA\frac{l+r}{2l}$$

added to the pivot shaft 5 are removed therefrom and instead the connecting rod 6 is connected to the pivot shaft at its large end, whereby a vibration-free piston-crank mechanism balanced in inertia force is obtained.

In the balancing method of the invention, the balance ring V having a mass of $mD$ and the balance ring W having a mass of $$mA \frac{l+r}{2l}$$

which are used for establishing the state of balance, are both circular in shape and the balance ring W is only required to have the holes 14, 14 therein which are concentric with the points a distance of $l-r$ spaced from the center of the balance ring W in opposite directions with respect to said center of the balance ring. This is advantageous in that the positions of the center of gravities of the balance rings V and W can be determined accurately and consequently a piston-crank mechanism can be easily precisely balanced in a simple manner.

Although the present invention has been described and illustrated in terms of particular embodiments thereof, it should be understood that the invention is not restricted to the details of the constructions shown but many changes and modifications can be made within the scope of the invention defined in the appended claims.

We claim:

1. A piston-crank mechanism comprising piston means disposed in a cylinder for reciprocal motion therein, a crank shaft rotatably supported within a crank case an internal gear fixed to the inner wall of said crank case, a smaller gear meshing with said internal gear and having a number of teeth one half of that of said internal gear, means for rotatably supporting said smaller gear on said crank shaft in eccentric relation to the axis of rotation of said crank shaft, and a connecting rod having one end pivotally connected to said smaller gear at a point inside the pitch circle of the latter.

2. A piston-crank mechanism as defined in claim 1, wherein said crank shaft is provided with a bodily rotation balancing mass at a location eccentric to the center thereof in a direction opposite to the direction of eccentricity of said smaller gear relative to said crank shaft and said smaller gear is provided with a rotation balancing mass at a location eccentric to the center thereof in a direction diametrically opposite to the point of pivotal connection between said smaller gear and said connecting rod.

3. A piston-crank mechanism as defined in claim 2, wherein said other end of said connecting rod is pivotally connected to said smaller gear at a point inside the pitch circle of the latter and said rotation balancing mass satisfies the equation $$mB \cdot RB = \frac{l+r}{2} mA + mD \cdot r$$

wherein:

$l=$ the crank radius of the crank shaft
$r=$ the eccentric distance of the point of pivotal connection between the connecting rod and said smaller gear, relative to said smaller gear
$mA=$ reciprocating mass
$mB=$ the rotation balancing mass
$mD=$ rotating mass and said bodily rotation balancing mass satisfies the equation $$mC \cdot RC = mB \cdot l + \frac{l+r}{2} mA + mD \cdot l$$

wherein:

$RC=$ the eccentric distance of the bodily rotation balancing means
$mC=$ the bodily rotation balancing mass.

4. A piston-crank mechanism comprising a piston disposed in a cylinder for reciprocal motion therein, a crank shaft rotatably supported within a crank case and having a crank web and a crank pin, an internal gear fixed to the inner wall of said crank case, a smaller gear meshing with said internal gear and having a number of teeth one half of that of said internal gear and rotatably mounted on the crank pin of said crank shaft, and a connecting rod having one end connected to said piston and the other end pivotally connected to said smaller gear at a point inside the pitch circle thereof by a pivot pin, said crank web being substantially smaller than the inner diameter of and inserted into said internal gear and having a cavity formed in one side surface thereof for receiving said smaller gear.

5. In a piston-crank mechanism comprising a crank shaft having a crank pin provided at an eccentric distance of $l$, a smaller gear rotatably mounted on said crank pin, an internal gear having a number of teeth twice that of and meshing with said smaller gear, a pivot shaft mounted on said smaller gear at an eccentric distance of $r$ which is smaller than said distance of $l$ and a connecting rod connecting said pivot shaft with said piston, the masses connected to said pivot shaft being a reciprocating mass $mA$ and a rotating mass $mD$, a crank balancing method comprising attaining the balance around the crank pin of the parts rotatably mounted on said crank pin by attaching the mass $mD$ to the pivot shaft coaxially therewith and a mass $$\frac{l+r}{2l} mA$$

to the same at an eccentric distance of $l-r$ from the axis of said pivot shaft in the direction of eccentricity of said pivot shaft, in said formulae $l$ being the crank radius of the crank shaft and $r$ being the eccentric distance of the point of pivotal connection between the connecting rod and the smaller gear relative to the smaller gear, mounting the assembly on the crank shaft and thereafter attaining the balance of the crank shaft around the crank shaft bearings.

References Cited

UNITED STATES PATENTS

| | | | |
|---|---|---|---|
| 1,756,915 | 4/1930 | Short | 74—604 |
| 399,492 | 3/1889 | Burke | 123—197 AC |
| 1,756,914 | 4/1930 | Short | 74—604 |

WILLIAM F. O'DEA, Primary Examiner

W. S. RATLIFF, JR., Assistant Examiner

U.S. Cl. X.R.

123—197 AC